United States Patent
Wang et al.

(10) Patent No.: US 11,954,336 B2
(45) Date of Patent: Apr. 9, 2024

(54) DYNAMIC MEMORY MANAGEMENT OPERATION

(71) Applicant: Micron Technology, Inc., Boise, ID (US)

(72) Inventors: Xing Wang, Shanghai (CN); Liu Yang, Shanghai (CN); Xiaolai Zhu, Shanghai (CN); Bin Zhao, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 94 days.

(21) Appl. No.: 17/637,428

(22) PCT Filed: Mar. 18, 2021

(86) PCT No.: PCT/CN2021/081538
§ 371 (c)(1),
(2) Date: Feb. 22, 2022

(87) PCT Pub. No.: WO2022/193231
PCT Pub. Date: Sep. 22, 2022

(65) Prior Publication Data
US 2023/0350579 A1    Nov. 2, 2023

(51) Int. Cl.
*G06F 12/00*    (2006.01)
*G06F 3/06*    (2006.01)

(52) U.S. Cl.
CPC ............ *G06F 3/0622* (2013.01); *G06F 3/064* (2013.01); *G06F 3/0679* (2013.01)

(58) Field of Classification Search
CPC ....... G06F 3/0622; G06F 3/064; G06F 3/0679
See application file for complete search history.

(56) References Cited

U.S. PATENT DOCUMENTS

2007/0234183 A1* 10/2007 Hwang ................. G11C 29/52
                                                          714/763
2008/0229100 A1    9/2008 Trodden et al.
(Continued)

FOREIGN PATENT DOCUMENTS

CN    107301016 A    10/2017
CN    110895448 A    3/2020
(Continued)

OTHER PUBLICATIONS

ISA/CN, "International Search Report and Written Opinion of the International Searching Authority," issued in connection with Int'l Appl. No. PCT/CN2021/081538, dated Dec. 17, 2021 (10 pages).

*Primary Examiner* — John A Lane
(74) *Attorney, Agent, or Firm* — Holland & Hart LLP

(57) ABSTRACT

Methods, systems, and devices for dynamic memory management operation are described. A memory system may store data in a first block that includes a first type of memory cells configured to store a single bit of information (e.g., single level cells (SLCs)). The memory system may set a flag associated with the data indicating whether the data includes secure information and is to remain in a block that includes SLCs after a memory management operation (e.g., a garbage collection operation). The memory system may store, as part of the memory management operation for the first block and based on the flag, valid data of the first block in a second block that includes SLCs or a third block that includes a second type of memory cells configured to store two or more bits of information.

25 Claims, 5 Drawing Sheets

(56) References Cited

U.S. PATENT DOCUMENTS

| | | | |
|---|---|---|---|
| 2008/0316819 A1* | 12/2008 | Lee | G11C 11/5621 |
| | | | 365/185.11 |
| 2013/0173844 A1* | 7/2013 | Chen | G11C 16/349 |
| | | | 711/E12.008 |
| 2021/0026767 A1* | 1/2021 | Park | G06F 9/30189 |
| 2022/0050627 A1* | 2/2022 | Pratt | G11C 16/10 |

FOREIGN PATENT DOCUMENTS

| | | |
|---|---|---|
| CN | 110895449 A | 3/2020 |
| CN | 111159781 A | 5/2020 |

* cited by examiner

DYNAMIC MEMORY MANAGEMENT OPERATION

CROSS REFERENCE

The present application for patent is a 371 national phase filing of International Patent Application No. PCT/CN2021/081538 by Wang et al., entitled "DYNAMIC MEMORY MANAGEMENT OPERATION," filed Mar. 18, 2021, assigned to the assignee hereof, and expressly incorporated by reference herein.

FIELD OF TECHNOLOGY

The following relates generally to one or more systems for memory and more specifically to dynamic memory management operation.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAIVI), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
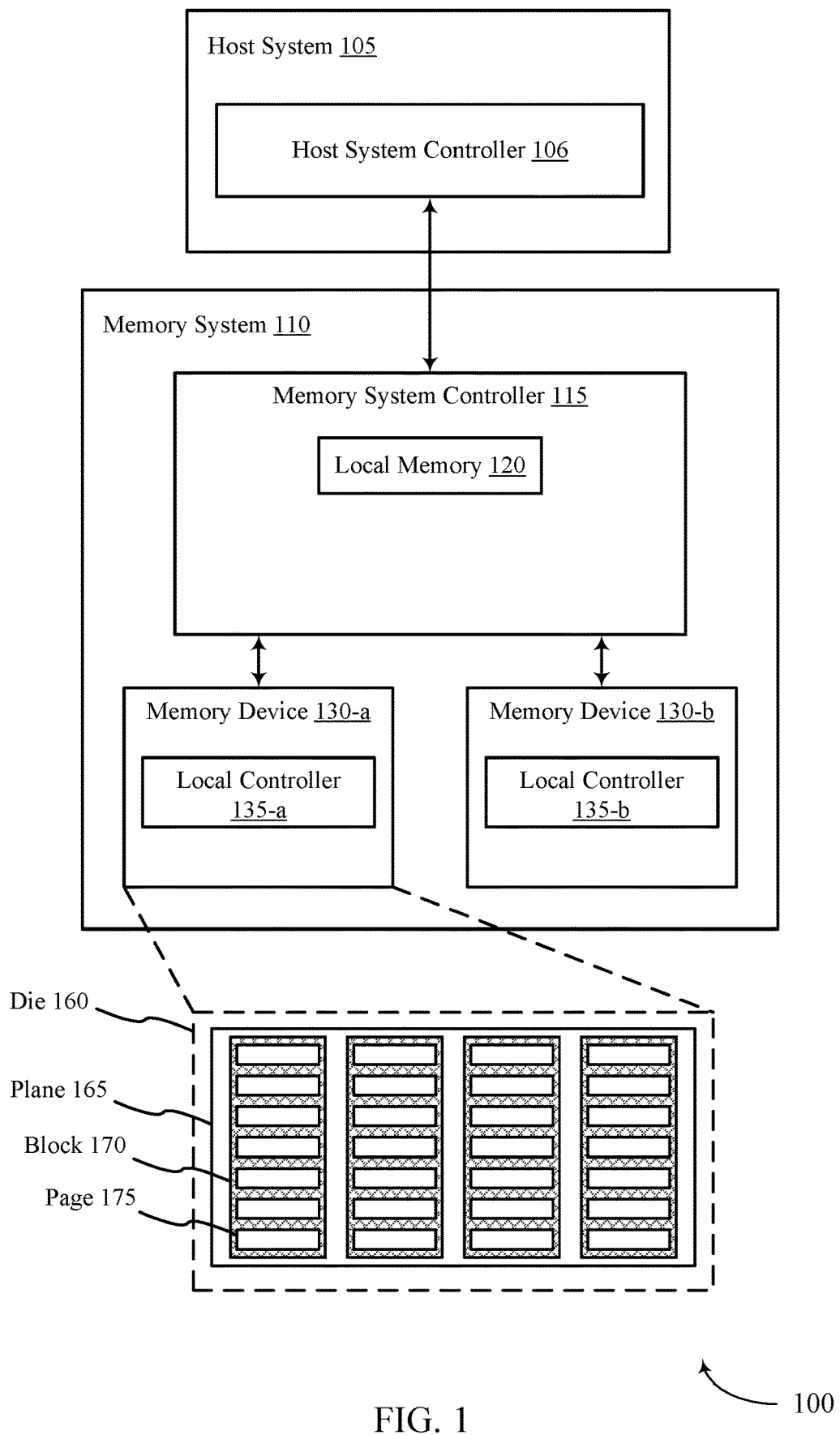
FIG. 1 illustrates an example of a system that supports dynamic memory management operation in accordance with examples as disclosed herein.

A memory system may perform one or more memory management (e.g., maintenance) operations to improve a performance of the memory system. For example, the memory system may determine to perform a garbage collection operation on a block of memory cells. In connection with a garbage collection operation for a block of memory cells, the memory system may evaluate a logical-to-physical (L2P) table to identify which of the sets of data stored by the block of memory cells are valid. The memory system may then store the valid data in a different block of memory cells and erase the data (e.g., the valid data and the invalid data) stored in the block of memory cells, which may make the block of memory cells available to store new data, for example. In some cases, a memory management operation (e.g., a garbage collection operation) to change the storage density of the data. For examples, sometimes data stored in SLC blocks may be moved to MLC blocks, TLC blocks, or QLC blocks to increase the storage density of the data. Storing data in MLC blocks, TLC blocks, or QLC blocks may reduce the reliability of the data stored, may take additional power, and the access operations may take longer.

Additionally or alternatively, the memory system include one or more blocks of memory cells configured to store data securely (e.g., more securely than other portions of the memory system configured to store data). For example, the memory system may include a Replay Protected Memory Block (RPMB) configured to store data securely. In order to access data stored in the RPMB, the memory system may first perform an authentication procedure (e.g., provide a key to access the RPMB). For example, in order to write data to the RPMB, the memory system may perform the authentication procedure (e.g., using an RPMB key) prior to performing an authenticated write operation on the RPMB. Additionally, the memory system may generate a copy of the RPMB data to store in another block to increase the reliability of the RPMB data.

An RPMB block may include an single-level cell (SLC) block (e.g., may include SLCs), which may be associated with a higher reliability when compared to blocks configured to store two or more bits of information (e.g., blocks including multi-level cells (MLCs), blocks including tri-level cells (TLCs), or blocks including quad-level cells (QLCs)). The blocks including types of cells configured to store one or bit of information may be referred to as, for example, SLC blocks, MLC blocks, TLC blocks, or QLC blocks. When performing a memory management operation such as a garbage collection operation at an RPMB, the memory system may store the valid data in another SLC block of memory cells (e.g., instead of an MLC, TLC, or QLC block) to ensure that the RPMB data is stored with more reliability than other types of blocks after an execution of the memory management operation. In some cases, the memory system may include one or more dedicated RPMB blocks. That is, the memory system may include blocks of memory cells that are configured to store RPMB data. When executing a garbage collection operation at a memory system including dedicated RPMB blocks, the memory system may store valid data from a first RPMB block in a second RPMB block.

In some other cases, the memory system may include one or more dynamic RPMB blocks. That is, the memory system may include SLC blocks that may or may not store RPMB data. In a case that the memory system includes dynamic RPMB blocks, prior to executing a garbage collection operation at an SLC block, the memory system may determine whether the SLC block includes RPMB data (e.g., as opposed to data not associated with an RPMB block) to ensure that the valid RPMB data is stored in another SLC block (e.g., as opposed to an MLC, TLC, or QLC block) after the execution of the garbage collection operation. For example, the memory system may set a flag associated with each SLC block to indicate whether the data is to be stored at an SLC block during a garbage collection operation. That is, if the SLC block is storing secure information (e.g., RPMB data), the memory system may set the flag associated with the SLC block to indicate that the valid data stored in the SLC block is to remain in an SLC block after the garbage collection. Additionally, if the SLC block is storing other data (e.g., associated with a host system), the memory system may set the flag associated with the SLC block to indicate that the valid data stored in the SLC block may be stored in non-SLC blocks (e.g., MLC, TLC, or QLC blocks) after the garbage collection Features of the disclosure are initially described in the context of systems with reference to FIGS. 1 through 2. Features of the disclosure are described in the context of a process flow with reference to FIG. 3. These and other features of the disclosure are further illustrated by and described in the context of an apparatus diagram and a flowchart that relate to dynamic memory management operation with reference to FIGS. 4 and 5.

FIG. 1 illustrates an example of a system 100 that supports dynamic memory management operation in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magnetic RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally or alternatively, a NAND memory device 130 may include memory cells configured to each store multiple bits of information, which may be referred to as MLCs if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support dynamic memory management operation. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system controller 115 or a local controller 135 may perform memory management operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for some or all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The memory system 110 may store RPMB data in any of the SLC blocks 170 of the memory device 130 (e.g., blocks 170-a and 170-b). That is, the memory system 110 may dynamically select one or more SLC blocks 170 within the memory device 130 to be RPMBs configured store data securely (e.g., when compared to other blocks 170 within the memory device). In a case that the memory system 110 stores RPMB data (e.g., secure information) in an SLC block 170 (e.g., block 170-a or block 170-b), the memory system 110 may first perform an authentication procedure (e.g., provide a key to access the RPMB) prior to accessing the SLC block 170. Additionally, the memory system 110 may generate a copy of the RPMB data stored in the SLC block 170 (e.g., the dynamic RPMB block 170) and store the copied RPMB data in another SLC block 170 of the memory device 130. For example, in a case that memory system 110 stores RPMB data in SLC block 170-a of the memory device 130, the memory system 110 may additionally generate a copy of the RPMB data and store the copied RPMB data in the SLC block 170-*b*. In some cases, generating and storing the copy of the RPMB data may improve a reliability of secure data. For example, the copy of the data may be referenced instead of the original data in cases where the original data becomes corrupted. Further, referencing the copy of the data may have computational advantages as well (e.g., less SRAM used to reference the copy).

In some cases, the memory system 110 may include one or more dynamic RPMB blocks. That is, the memory system 110 may include SLC blocks 170 that may or may not store RPMB data. In a case that the memory system includes dynamic RPMB blocks, prior to executing a garbage collection operation at an SLC block, the memory system may determine whether the SLC block 170 includes RPMB data (e.g., as opposed to data not associated with an RPMB block) to ensure that the valid RPMB data is stored in another SLC block 170 (e.g., as opposed to an MLC, TLC, or QLC block) after the execution of the garbage collection operation. For example, the memory system may set a flag associated with each SLC block 170 to indicate whether the data is to be stored at an SLC block 170 during a garbage collection operation. That is, if the SLC block 170 is storing secure information (e.g., RPMB data), the memory system 110 may set a flag associated with the SLC block 170 to indicate that the valid data stored in the SLC block 170 is to remain in the current SLC block or moved to a different SLC block 170 as part of the garbage collection operation. Additionally, if the SLC block 170 is storing other data (e.g., associated with a host system 105), the memory system 110 may set the flag associated with the SLC block 170 to indicate that the valid data stored in the SLC block 170 may be stored in non-SLC blocks (e.g., MLC, TLC, or QLC blocks) after the garbage collection operation.

Figure 2:
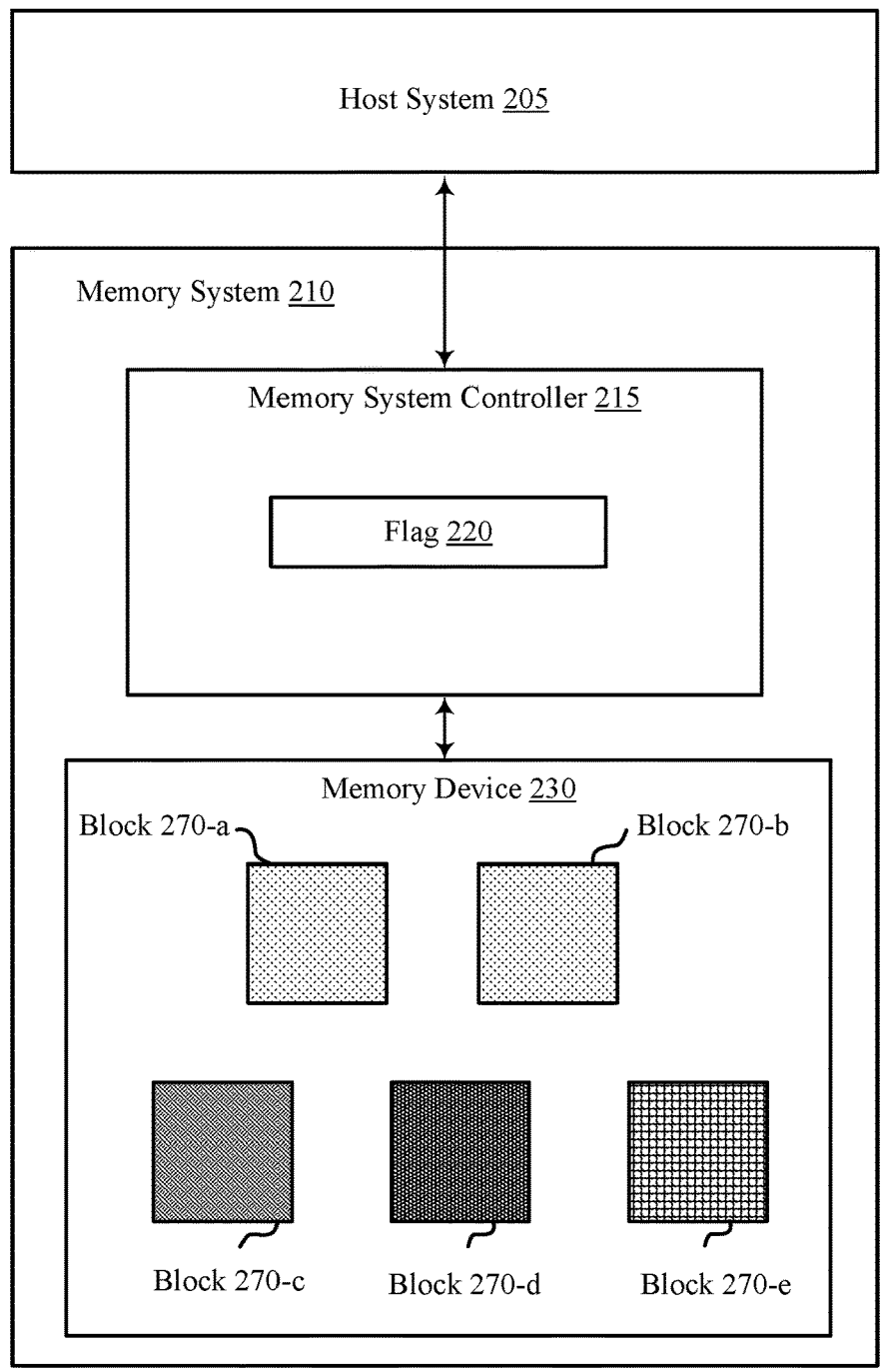
FIG. 2 illustrates an example of a system that supports dynamic memory management operation in accordance with examples as disclosed herein.

FIG. 2 shows an example of a system 200 that supports techniques for dynamic memory management operation in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the host system 205, the memory system 210, the memory device 230, and the blocks 270 may be examples of systems, devices, and components as described with reference to FIG. 1.

In some examples, the memory system 210 may include a memory device 230, which may include a quantity of blocks 270. For example, the memory device 230 may include a block 270-*a*, a block 270-*b*, a block 270-*c*, and a block 270-*d*. Each block 270 may include a set of memory cells configured to store one or more bits of data. For example, the block 270-*a* and the block 270-*b* may be examples of SLC blocks 270. That is, the blocks 270-*a* and 270-*b* may include memory cells each configured to store one bit of data. Additionally, the block 270-*c* may be an example of an MLC block 270-*c* that includes memory cells configured to store two bits of data, the block 270-*d* may be an example of a TLC block 270-*d* with memory cells that are configured to store three bits of data, and the block 270-*e* may be an example of a QLC block 270-*e* with memory cells configured to store four bits of data.

The memory system 210 may further include a memory system controller 215. The memory system controller may receive access commands (e.g., read commands or write commands) from the host system 205. Further, the memory system controller may include a flag 220. In some examples, the flag 220 may indicate whether data stored in any of the quantity of blocks 270 includes secure information.

The memory system 210 may store RPMB data in any of the SLC blocks 270 of the memory device 230 (e.g., blocks 270-*a* and 270-*b*). That is, the memory system 210 may dynamically select one or more SLC blocks 270 within the memory device 230 to be RPMBs configured store data securely (e.g., when compared to other blocks 270 within the memory device). In a case that the memory system 210 stores RPMB data (e.g., secure information) in an SLC block 270 (e.g., block 270-*a* or block 270-*b*), the memory system 210 may first perform an authentication procedure (e.g., provide a key to access the RPMB) prior to accessing the SLC block 270. Additionally, the memory system 210 may generate a copy of the RPMB data stored in the SLC block 270 (e.g., the dynamic RPMB block 270) and store the copied RPMB data in another SLC block 270 of the memory device 230. For example, in a case that memory system 210 stores RPMB data in SLC block 270-*a* of the memory device 230, the memory system 210 may additionally generate a copy of the RPMB data and store the copied RPMB data in the SLC block 270-*b*. In some cases, generating and storing the copy of the RPMB data may improve a reliability of secure data. For example, the copy of the data may be referenced instead of the original data in cases where the original data becomes corrupted. Further, referencing the copy of the data may have computational advantages as well (e.g., less SRAM used to reference the copy).

When storing data in an SLC block 270, the memory system 210 may set a flag 220 associated with the block 270 indicating whether the block 270 is storing secure information (e.g., RPMB data). For example, in a case that the memory system controller 215 stores data associated with a host system 205 (e.g., different from RPMB data) in the block 270-*b*, the memory system controller 215 may set a flag 220 associated with the block 270-*b* to indicate that the data does not comprise secure information. Additionally, in a case that the memory system controller 215 stores secure information (e.g., RPMB data) in the block 270-*b*, the memory system controller 215 may set the flag 220 associated with the block 270-*b* to indicate that the data does comprise secure information.

The memory system controller 215 may perform a memory management operation on a block 270 of the memory device 230. For example, the memory system controller 215 may perform a garbage collection operation on the block 270-*a* of the memory device 230. Here, the memory system controller 215 may identify the valid data stored within the block 270-*a* (e.g., using an L2P table) and may store the valid data from the block 270-*a* in another block 270 of the memory device 230 (e.g., block 270-*b*, block 270-*c*, block 270-*d*, or block 270-*e*). Then, the memory system controller 215 may erase the data stored in the first block 270-*a* of the memory device 230.

If the value of the flag 220 associated with a block 270 indicates that the valid data in a block 270 includes secure information (e.g., RPMB data), during an execution of a garbage collection operation the memory system 210 may store the valid data in a second block 270 that is configured to store secure information (e.g., an SLC block 270-*a* or 270-*b*). For example, if during a garbage collection operation at block 270-*a*, the memory system 210 determines that the flag 220 indicates that the block 270-*a* is storing RPMB data, the memory system 210 may transfer the RPMB data to another SLC block 270-*b* (e.g., that is configured to store secure information). Additionally or alternatively, if the value of the flag 220 indicates that the valid data in a block 270 does not include secure information, during an execution of a garbage collection operation, the memory system 210 may store the valid data in a second block 270 that may not be configured to store secure information (e.g., and MLC, TLC, or QLC block 270). For example, if during a garbage collection operation at block 270-*b*, the memory system 210 determines that the flag 220 indicates that the block 270-*b* is not storing RPMB data, the memory system 210 may transfer the valid data from block 270-*b* to a block 270 that includes MLCs, TLCs, or QLCs (e.g., the MLC block 270-*c*, the TLC block 270-*d*, or the QLC block 270-*e*).

Figure 3:
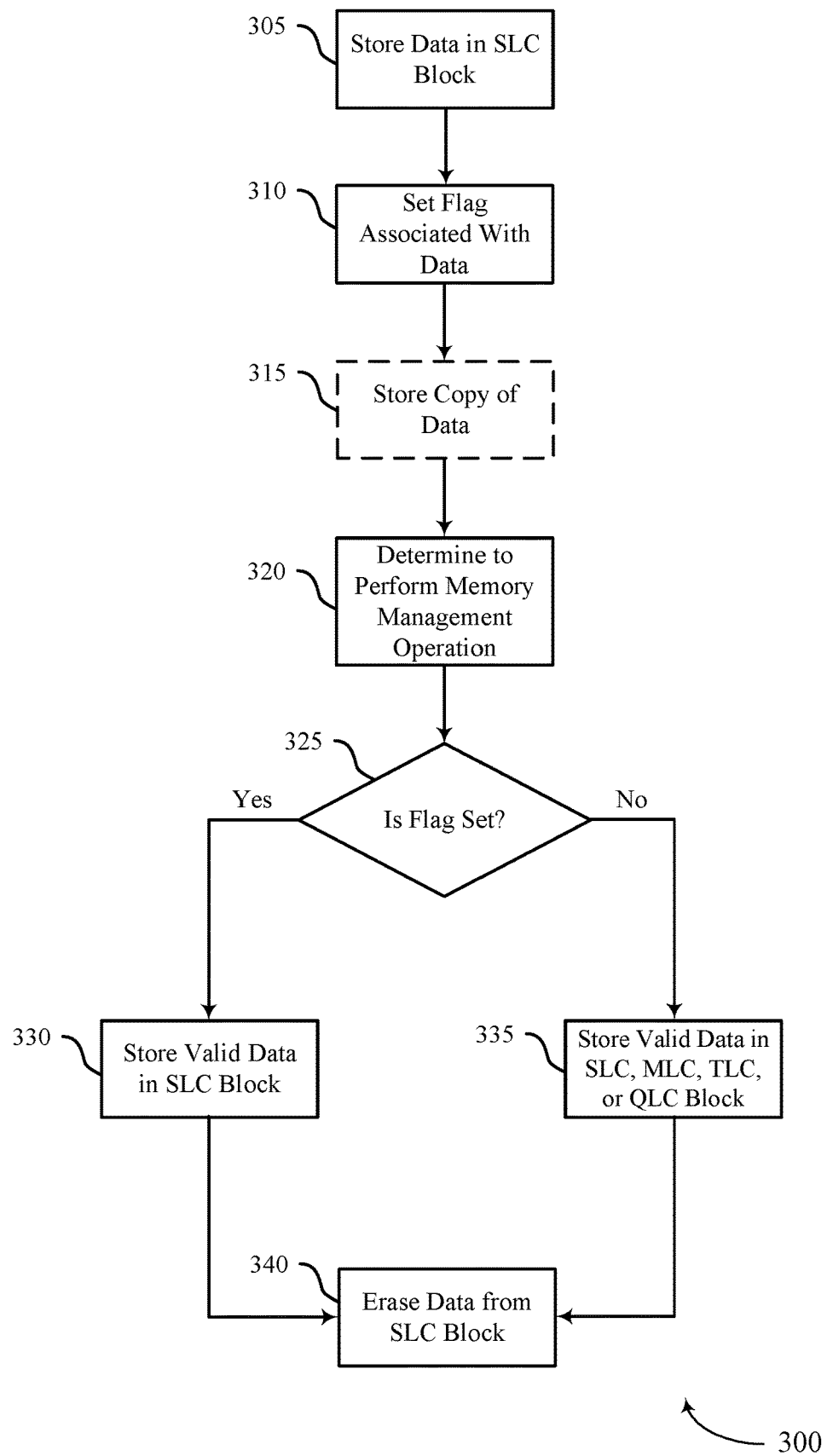
FIG. 3 illustrates an example of a process flow that supports dynamic memory management operation in accordance with examples as disclosed herein.

FIG. 3 shows an example diagram of a process flow 300 that supports dynamic memory management operation as described herein. The features of process flow 300 may be implemented or performed by a memory system (e.g., the memory system 110 or the memory system 210 described with reference to FIGS. 1 and 2, among others) or a component of a memory device such as the memory system controller 215 or the memory device 230, the local memory as described with reference FIG. 2. In the following description of the process flow 300, the operations may be performed in different orders or at different times. Some operations may also be omitted from the process flow 300, and other operations may be added to the process flow 300.

At 305, data may be stored in a first SLC block. For example, a memory system may store data in the first SLC block in response to receiving a write command from a host system. In another example, the memory system may generate one or more encryption keys for encrypting data (e.g., data received from the host system) stored in other blocks of the memory system. Here, the memory system may store the one or more encryption keys (e.g., secure information, RPMB data) in the first SLC block. In a case that the memory system stores secure information in the SLC block at 305, the first SLC block may function as an RPMB. That is, the memory system may perform one or more authentication procedures prior to accessing the data stored in the first SLC block.

At 310, a flag associated with the data may be set. For example, a memory controller may set the flag associated with the data indicating whether the data stored in the first SLC block includes secure information. That is, if at 305 the memory system stores data associated with the host system in the first SLC block, the memory system may set the flag associated with data to indicate that the data stored in the first SLC block does not include secure information. Additionally, if at 305 the memory system stores encryption keys (e.g., for encrypting data stored in one or more other blocks of the memory system), the memory system may set the flag to indicate that the data stored in the first SLC block includes secure information (e.g., RPMB data). In some cases, the memory controller may set the flag for any type of data that desires more reliable storage techniques or fewer errors in the stored data.

In some cases, the flag indicating whether the data stored in the first SLC block includes secure information may additionally indicate whether the data is to remain in a block that includes the first SLCs after a memory management operation (e.g., a garbage collection operation). That is, in a case that the flag indicates that the data stored in the first SLC block includes secure information (e.g., the first SLC block is an RPMB), the flag may additionally indicate that the data is to remain in an SLC block after a garbage collection operation. Further, in a case that the flag indicates that the data stored in the SLC block does not include secure information (e.g., the first SLC block is not an RPMB), the flag may additionally indicate that the data may be stored in a different type of block (e.g., an MLC, TLC, or QLC block) after the garbage collection operation.

At 315, a copy of the data stored in the first SLC block may optionally be generated and stored in another block of the memory system (e.g., another SLC block, an MLC, TLC, or QLC block). For example, if the first SLC block is an RPMB and the data includes secure information, the memory system may generate a copy of the RPMB data and store the RPMB data in another block of the memory system. This may increase a reliability of the RPMB data storage in the memory system. Additionally, if the first SLC block is not an RPMB (e.g., and is storing data associated with the host system rather than encryption keys for encrypting data at the memory system), the memory system may refrain from generating a copy of the data stored in the first SLC block.

At 320, it may be determined to perform a memory management operation at the first SLC block. For example, the memory system may determine to perform a garbage collection operation at the first SLC block to store the valid data within the first SLC block in another block of the memory system and erase the data stored in the first SLC block.

At 325, it may be determined whether the flag associated with the data is set. For example, the memory system may read a flag associated with the data stored within the first SLC block to determine whether the data stored within the first SLC block is secure information. In a case that the flag indicates that the data stored in the first SLC block includes secure information and is to remain in an SLC block after an execution of the garbage collection operation, the memory system may proceed to 330. Additionally, in a case that the flag indicates that the data stored in the first SLC block does not include secure information and may be stored in a different type of block after the execution of the garbage collection operation, the memory system may proceed to 335.

At 330, the valid data from the first SLC block may be stored in another SLC block. That is, the memory system may reference an L2P table to identify the valid data stored in the first SLC block and may store that valid data within a second SLC block at the memory system. Here, the second SLC block may then be an RPMB configured to store secure information. That is, in order to access the second SLC block (e.g., that is storing the secure information), the memory system may first perform one or more authentication procedures.

At 335, the valid data from the first SLC block may be stored in another SLC, MLC, TLC, or QLC block. That is, the memory system may reference an L2P table to identify the valid data stored in the first SLC block and may store that valid data within another block of the memory system.

At 340, the data stored in the first SLC block may be erased. That is, the memory system may erase that data stored in the first SLC after storing the valid data within the first SLC in another block (e.g., at 330 or 335). Here, the memory system may complete an execution of the garbage collection operation.

Figure 4:
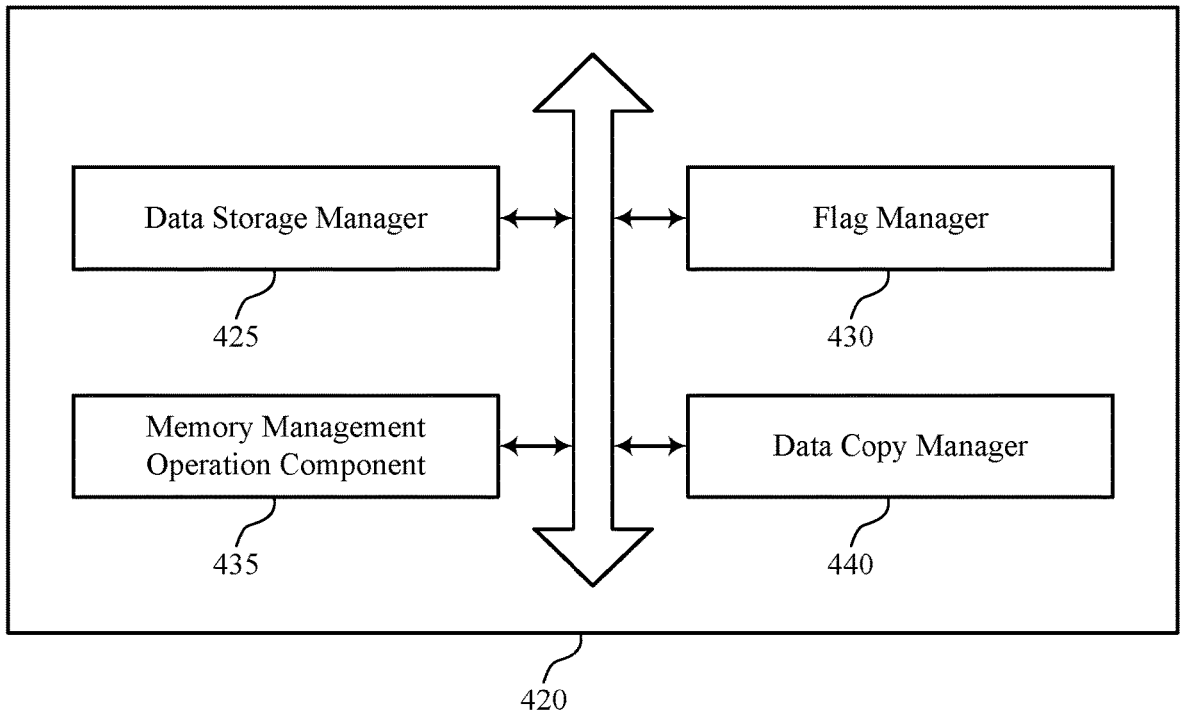
FIG. 4 shows a block diagram of a memory system that supports dynamic memory management operation in accordance with examples as disclosed herein.

FIG. 4 shows a block diagram 400 of a memory system 420 that supports dynamic memory management operation in accordance with examples as disclosed herein. The memory system 420 may be an example of aspects of a memory system as described with reference to FIGS. 1 through 3. The memory system 420, or various components thereof, may be an example of means for performing various aspects of dynamic memory management operation as described herein. For example, the memory system 420 may include a data storage manager 425, a flag manager 430, a memory management operation component 435, a data copy manager 440, or any combination thereof. Each of these components may communicate, directly or indirectly, with one another (e.g., via one or more buses).

The data storage manager 425 may be configured as or otherwise support a means for storing data in a first block that includes a first type of memory cells configured to store a single bit of information. The flag manager 430 may be configured as or otherwise support a means for setting a flag, associated with the data, indicating whether the data includes secure information and is to remain in a block that includes the first type of memory cells after a memory management operation. The memory management operation component 435 may be configured as or otherwise support a means for storing, as part of the memory management operation for the first block and based at least in part on the flag, valid data of the first block in a second block that includes the first type of memory cells or a third block that includes a second type of memory cells configured to store two or more bits of information.

In some examples, the data copy manager 440 may be configured as or otherwise support a means for generating a copy of the data based at least in part on the data including secure information. In some examples, the data storage manager 425 may be configured as or otherwise support a means for storing the copy of the data in a fourth block that includes the first type of memory cells, where setting the flag associated with the data is based at least in part on storing the copy of the data in the fourth block.

In some examples, to support setting the flag, the flag manager 430 may be configured as or otherwise support a means for setting the flag to indicate that the data includes secure information and is to remain in a block that includes the first type of memory cells after the memory management operation.

In some examples, to support storing the valid data of the first block, the memory management operation component 435 may be configured as or otherwise support a means for storing the valid data of the first block in the second block that includes the first type of memory cells configured to store a single bit of information.

In some examples, the first block and the second block each include an RPMB.

In some examples, to support setting the flag, the flag manager 430 may be configured as or otherwise support a means for setting the flag to indicate that the data is to be stored in a block that includes the second type of memory cells after the memory management operation.

In some examples, to support storing the valid data of the first block, the memory management operation component 435 may be configured as or otherwise support a means for storing the valid data of the first block in the third block that includes the second type of memory cells configured to store two or more bits of information.

In some examples, to support setting the flag indicating whether the data includes secure information, the flag manager 430 may be configured as or otherwise support a means for setting the flag indicating whether the data includes one or more encryption keys configured to encrypt data stored in another block.

In some examples, the memory management operation component 435 may be configured as or otherwise support a means for selecting the second block or the third block for the memory management operation based at least in part on whether the flag indicates that the data includes secure information and is to remain in the block that includes the first type of memory cells after the memory management operation, where storing the valid data of the first block is based at least in part on the selecting.

In some examples, the memory management operation component 435 may be configured as or otherwise support a means for erasing, as part of the memory management operation for the first block, the data in the first block based at least in part on storing the valid data of the first block in the second block.

In some examples, the memory management operation component 435 may be configured as or otherwise support a means for determining, as part of the memory management operation, to store the valid data of the first block in the second block that includes the first type of memory cells based at least in part on a value of the flag, where storing the valid data includes storing the valid data of the first block in the second block based at least in part on determining.

Figure 5:
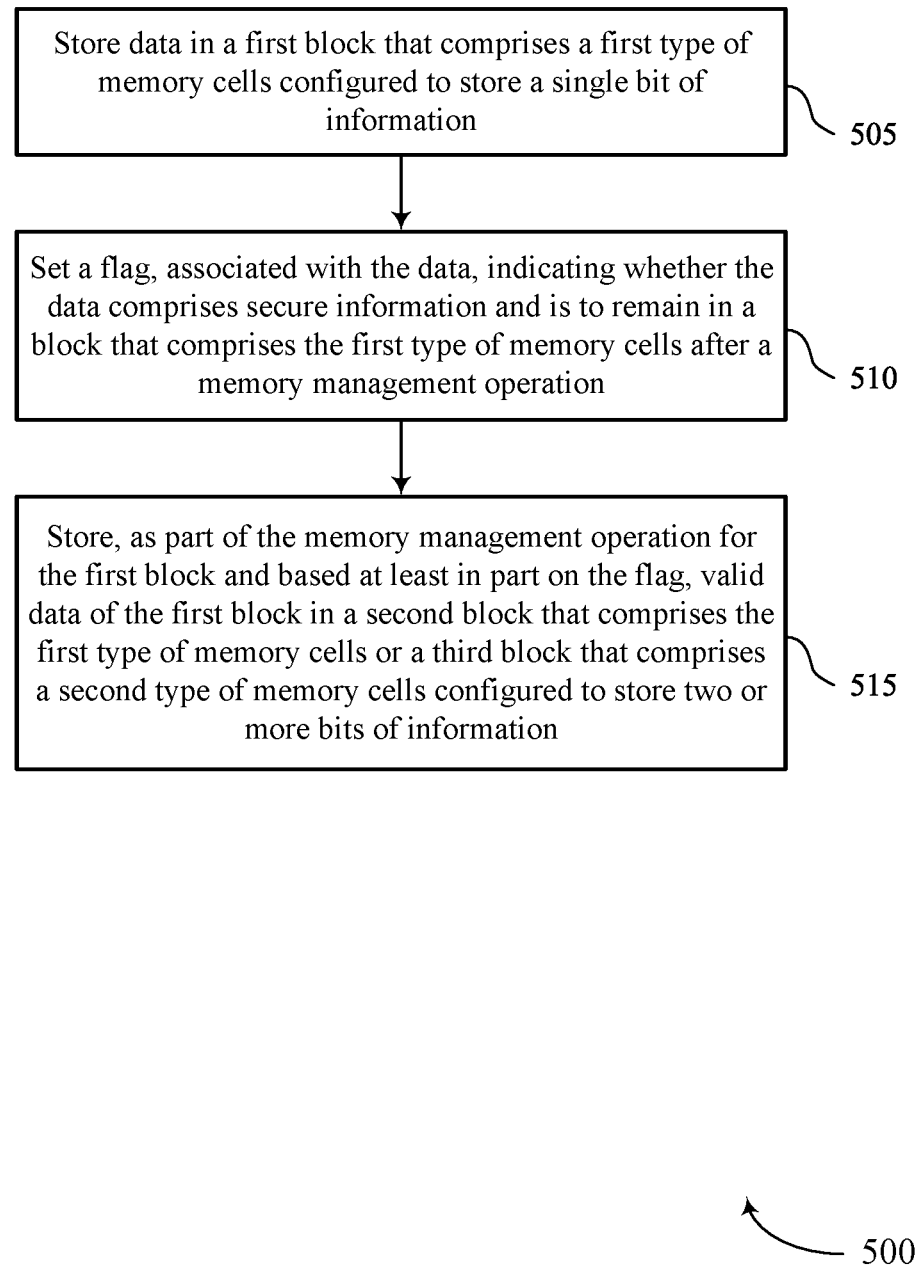
FIG. 5 shows a flowchart illustrating a method or methods that support dynamic memory management operation in accordance with examples as disclosed herein.

FIG. 5 shows a flowchart illustrating a method 500 that supports dynamic memory management operation in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include storing data in a first block that includes a first type of memory cells configured to store a single bit of information. The operations of 505 may be performed in accordance with examples as disclosed herein. In some examples, aspects of the operations of 505 may be performed by a data storage manager 425 as described with reference to FIG. 4.

At 510, the method may include setting a flag, associated with the data, indicating whether the data includes secure information and is to remain in a block that includes the first type of memory cells after a memory management operation. The operations of 510 may be performed in accordance with examples as disclosed herein. In some examples, aspects of the operations of 510 may be performed by a flag manager 430 as described with reference to FIG. 4.

At 515, the method may include storing, as part of the memory management operation for the first block and based at least in part on the flag, valid data of the first block in a second block that includes the first type of memory cells or a third block that includes a second type of memory cells configured to store two or more bits of information. The operations of 515 may be performed in accordance with examples as disclosed herein. In some examples, aspects of the operations of 515 may be performed by a memory management operation component 435 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for storing data in a first block that includes a first type of memory cells configured to store a single bit of information, setting a flag, associated with the data, indicating whether the data includes secure information and is to remain in a block that includes the first type of memory cells after a memory management operation, and storing, as part of the memory management operation for the first block and based at least in part on the flag, valid data of the first block in a second block that includes the first type of memory cells or a third block that includes a second type of memory cells configured to store two or more bits of information.

Some examples of the method 500 and the apparatus described herein may further include operations, features, circuitry, logic, means, or instructions for generating a copy of the data based at least in part on the data including secure information and storing the copy of the data in a fourth block that includes the first type of memory cells, where setting the flag associated with the data may be based at least in part on storing the copy of the data in the fourth block.

In some examples of the method 500 and the apparatus described herein, setting the flag may include operations, features, circuitry, logic, means, or instructions for setting the flag to indicate that the data includes secure information and may be to remain in a block that includes the first type of memory cells after the memory management operation.

In some examples of the method 500 and the apparatus described herein, storing the valid data of the first block may include operations, features, circuitry, logic, means, or instructions for storing the valid data of the first block in the second block that includes the first type of memory cells configured to store a single bit of information.

In some examples of the method 500 and the apparatus described herein, the first block and the second block each include an RPMB.

In some examples of the method 500 and the apparatus described herein, setting the flag may include operations, features, circuitry, logic, means, or instructions for setting the flag to indicate that the data may be to be stored in a block that includes the second type of memory cells after the memory management operation.

In some examples of the method 500 and the apparatus described herein, storing the valid data of the first block may include operations, features, circuitry, logic, means, or instructions for storing the valid data of the first block in the third block that includes the second type of memory cells configured to store two or more bits of information.

In some examples of the method 500 and the apparatus described herein, setting the flag indicating whether the data includes secure information may include operations, features, circuitry, logic, means, or instructions for setting the flag indicating whether the data includes one or more encryption keys configured to encrypt data stored in another block.

Some examples of the method 500 and the apparatus described herein may further include operations, features, circuitry, logic, means, or instructions for selecting the second block or the third block for the memory management operation based at least in part on whether the flag indicates that the data includes secure information and may be to remain in the block that includes the first type of memory cells after the memory management operation, where storing the valid data of the first block may be based at least in part on the selecting.

Some examples of the method 500 and the apparatus described herein may further include operations, features, circuitry, logic, means, or instructions for erasing, as part of the memory management operation for the first block, the data in the first block based at least in part on storing the valid data of the first block in the second block.

Some examples of the method 500 and the apparatus described herein may further include operations, features, circuitry, logic, means, or instructions for determining, as part of the memory management operation, to store the valid data of the first block in the second block that includes the first type of memory cells based at least in part on a value of the flag, where storing the valid data includes storing the valid data of the first block in the second block based at least in part on determining.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   processing circuitry coupled with the one or more memory devices and configured to cause the memory system to;
   store data in a first block that comprises a first type of memory cells configured to store a single bit of information;
   set a flag associated with the data indicating whether the data comprises secure information and is to remain in a block that comprises the first type of memory cells after a memory management operation; and
   store, as part of the memory management operation for the first block and based at least in part on the flag, valid data of the first block in a second block that comprises the first type of memory cells or a third block that comprises a second type of memory cells configured to store two or more bits of information.

2. The memory system of claim 1, wherein the processing circuitry is further configured to cause the memory system to:
   generate a copy of the data based at least in part on the data comprising secure information; and
   store the copy of the data in a fourth block that comprises the first type of memory cells, wherein setting the flag associated with the data is based at least in part on storing the copy of the data in the fourth block.

3. The memory system of claim 1, wherein, to set the flag, the processing circuitry is configured to cause the memory system to:
   set the flag to indicate that the data comprises secure information and is to remain in the block that comprises the first type of memory cells after the memory management operation.

4. The memory system of claim 3, wherein, to store the valid data of the first block, the processing circuitry is configured to cause the memory system to:
   store the valid data of the first block in the second block that comprises the first type of memory cells configured to store the single bit of information.

5. The memory system of claim 4, wherein the first block and the second block each comprise a Replay Protected Memory Block (RPMB).

6. The memory system of claim 1, wherein, to set the flag, the processing circuitry is configured to cause the memory system to:
   set the flag to indicate that the data is to be stored in a block that comprises the second type of memory cells after the memory management operation.

7. The memory system of claim 6, wherein, to store the valid data of the first block, the processing circuitry is configured to cause the memory system to:
   store the valid data of the first block in the third block that comprises the second type of memory cells configured to store two or more bits of information.

8. The memory system of claim 1, wherein, to set the flag, the processing circuitry is configured to cause the memory system to:
   set the flag indicating whether the data comprises one or more encryption keys configured to encrypt data stored in another block.

9. The memory system of claim 1, wherein the processing circuitry is further configured to cause the memory system to:
   select the second block or the third block for the memory management operation based at least in part on whether the flag indicates that the data comprises secure information and is to remain in the block that comprises the first type of memory cells after the memory management operation, wherein storing the valid data of the first block is based at least in part on the selecting.

10. The memory system of claim 1, wherein the processing circuitry is further configured to cause the memory system to:
    erase, as part of the memory management operation for the first block, the data in the first block based at least in part on storing the valid data of the first block in the second block.

11. The memory system of claim 1, wherein the processing circuitry further configured to cause the memory system to:
    determine, as part of the memory management operation, to store the valid data of the first block in the second block that comprises the first type of memory cells based at least in part on a value of the flag, wherein storing the valid data comprises storing the valid data of the first block in the second block based at least in part on determining.

12. A non-transitory computer-readable medium storing code comprising instructions which, when executed by one or more processors of an electronic device, cause the electronic device to:
    store data in a first block that comprises a first type of memory cells configured to store a single bit of information;
    set a flag, associated with the data, indicating whether the data comprises secure information and is to remain in a block that comprises the first type of memory cells after a memory management operation; and store, as part of the memory management operation for the first block and based at least in part on the flag, valid data of the first block in a second block that comprises the first type of memory cells or a third block that comprises a second type of memory cells configured to store two or more bits of information.

13. The non-transitory computer-readable medium of claim 12, wherein the instructions, when executed by the one or more processors of the electronic device, further cause the electronic device to:

generate a copy of the data based at least in part on the data comprising secure information; and store the copy of the data in a fourth block that comprises the first type of memory cells, wherein setting the flag associated with the data is based at least in part on storing the copy of the data in the fourth block.

14. The non-transitory computer-readable medium of claim 12, wherein the instructions to set the flag when executed by the one or more processors of the electronic device, further cause the electronic device to:

set the flag to indicate that the data comprises secure information and is to remain in the block that comprises the first type of memory cells after the memory management operation.

15. The non-transitory computer-readable medium of claim 14, wherein the instructions to store the valid data of the first block when executed by the one or more processors of the electronic device, further cause the electronic device to:

store the valid data of the first block in the second block that comprises the first type of memory cells configured to store the single bit of information.

16. The non-transitory computer-readable medium of claim 15, wherein the first block and the second block each comprise a Replay Protected Memory Block (RPMB).

17. The non-transitory computer-readable medium of claim 12, wherein the instructions to set the flag when executed by the one or more processors of the electronic device, further cause the electronic device to:

set the flag to indicate that the data is to be stored in a block that comprises the second type of memory cells after the memory management operation.

18. The non-transitory computer-readable medium of claim 17, wherein the instructions to store the valid data of the first block when executed by the one or more processors of the electronic device, further cause the electronic device to:

store the valid data of the first block in the third block that comprises the second type of memory cells configured to store two or more bits of information.

19. The non-transitory computer-readable medium of claim 12, wherein the instructions to set the flag indicating whether the data comprises secure information when executed by the one or more processors of the electronic device, further cause the electronic device to:

set the flag indicating whether the data comprises one or more encryption keys configured to encrypt data stored in another block.

20. The non-transitory computer-readable medium of claim 12, wherein the instructions, when executed by the one or more processors of the electronic device, further cause the electronic device to:

select the second block or the third block for the memory management operation based at least in part on whether the flag indicates that the data comprises secure information and is to remain in the block that comprises the first type of memory cells after the memory management operation, wherein storing the valid data of the first block is based at least in part on the selecting.

21. The non-transitory computer-readable medium of claim 12, wherein the instructions, when executed by the one or more processors of the electronic device, further cause the electronic device to:

erase, as part of the memory management operation for the first block, the data in the first block based at least in part on storing the valid data of the first block in the second block.

22. A method performed by a memory system, comprising:

storing data in a first block that comprises a first type of memory cells configured to store a single bit of information;

setting a flag associated with the data indicating whether the data comprises secure information and is to remain in a block that comprises the first type of memory cells after a memory management operation; and storing, as part of the memory management operation for the first block and based at least in part on the flag, valid data of the first block in a second block that comprises the first type of memory cells or a third block that comprises a second type of memory cells configured to store two or more bits of information.

23. The method of claim 22, further comprising;

generating a copy of the data based at least in part on the data comprising secure information; and storing the copy of the data in a fourth block that comprises the first type of memory cells, wherein setting the flag associated with the data is based at least in part on storing the copy of the data in the fourth block.

24. The method of claim 22, wherein setting the flag comprises:

setting the flag to indicate that the data comprises secure information and is to remain in the block that comprises the first type of memory cells after the memory management operation.

25. The method of claim 24, wherein storing the valid data of the first block comprises:

storing the valid data of the first block in the second block that comprises the first type of memory cells configured to store the single bit of information.

* * * * *